(12) United States Patent
Ziegler

(10) Patent No.: US 6,797,927 B2
(45) Date of Patent: Sep. 28, 2004

(54) OPTICAL PARAMETER MEASURING WITH TEMPERATURE ASSIGNMENT

(75) Inventor: Patrick Ziegler, Böblingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/643,510

(22) Filed: Aug. 19, 2003

(65) Prior Publication Data

US 2004/0089652 A1 May 13, 2004

(30) Foreign Application Priority Data

Nov. 13, 2002 (EP) .............................................. 02025300

(51) Int. Cl.$^7$ ................................................. H05B 1/02
(52) U.S. Cl. ....................... 219/502; 219/497; 219/492; 324/527; 324/71.5; 438/16
(58) Field of Search ................................. 219/492, 497, 219/502, 494, 121.43; 324/501, 71.5, 527; 356/43; 438/14–16

(56) References Cited

U.S. PATENT DOCUMENTS

| 5,741,070 A | 4/1998 | Moslehi ...................... 374/161 |
|---|---|---|
| 5,838,437 A | * 11/1998 | Miller et al. ................. 356/478 |
| 6,304,586 B1 | * 10/2001 | Pease et al. .............. 372/38.02 |
| 6,614,829 B1 | * 9/2003 | Tuganov et al. ............. 372/107 |
| 2003/0098692 A1 | * 5/2003 | Cotton et al. ................ 324/537 |

FOREIGN PATENT DOCUMENTS

| GB | 2122337 | 1/1984 |
|---|---|---|
| WO | WO 01/36916 A3 | 5/2001 |

* cited by examiner

Primary Examiner—Mark Paschall

(57) ABSTRACT

The present invention relates to a measuring system adapted for providing a measurement of an optical parameter of an optical device under test —DUT—, comprising a measuring instrument adapted to perform the measurement and to provide a measurement signal comprising a plurality of values of the measured optical parameter of the DUT over the time.

To improve the measurement the measuring system is adapted to receive a temperature signal comprising a plurality of values of the measured temperature of the DUT over the time, and to provide an output signal wherein values of the measured temperature are associated to such values of the measured optical parameter of the DUT that correspond in time.

12 Claims, 1 Drawing Sheet

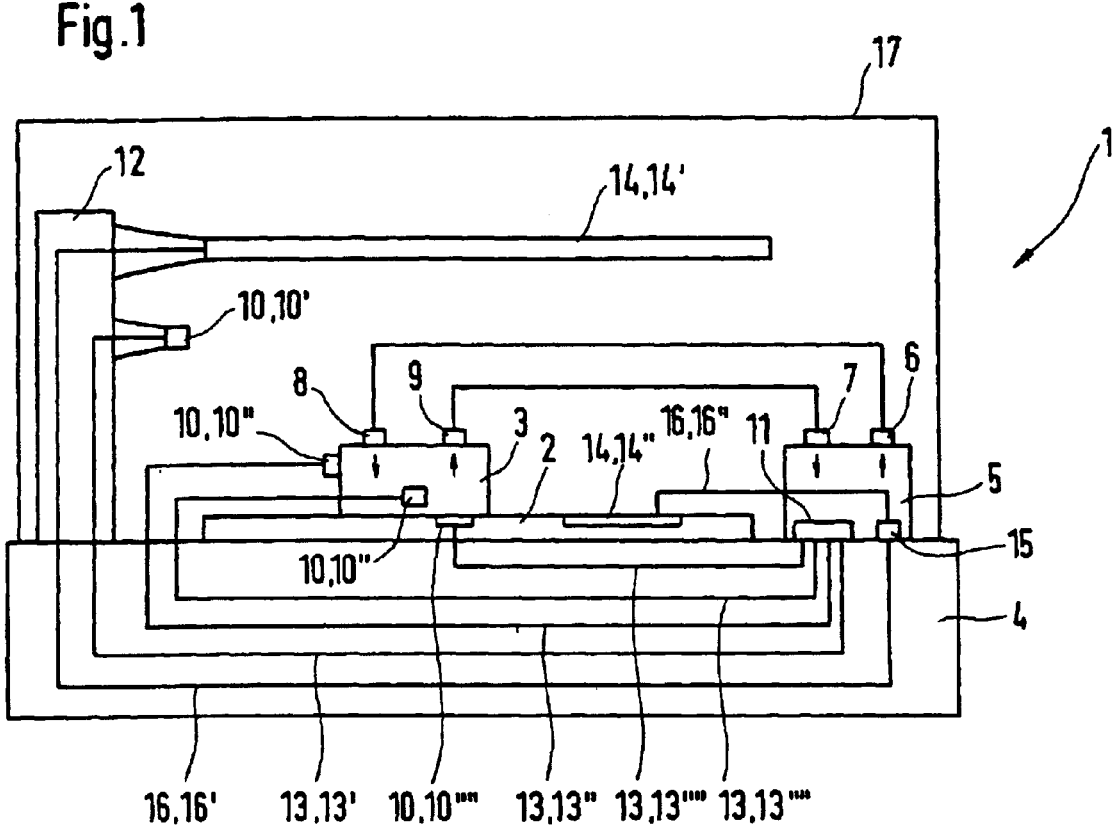

OPTICAL PARAMETER MEASURING WITH TEMPERATURE ASSIGNMENT

BACKGROUND OF THE INVENTION

The present invention refers to measuring of optical parameters of optical devices.

SUMMARY OF THE INVENTION

It is an object of the present invention to provide an improved measurement. The object is solved by the independent claim. Preferred embodiments are shown by the dependent claims.

Providing a temperature signal and associating said temperature to the measured optical parameters allows a temperature depending evaluation of the optical parameters. An evaluation taking into consideration the temperature of the respective DUT improves the performance, the reproducibility and the reliability of the measurement.

In the context of the present invention only optical parameters shall be referred to as "parameter", with temperature being explicitly excluded.

Since the measuring instrument is adapted to perform a real-time measurement of the parameters and the temperature, there can be created a very close relationship and in particular a definite association between the values of the parameters and the temperatures. This conjunction between parameters and associated temperature also allows an evaluation of the dependency of the parameters on the temperature.

Some characteristics of optical filters depend on temperature. For example a center wavelength of a specific type of filter, e.g. an arrayed waveguide, can be adjusted by varying temperature. With help of the invention it is possible to automatically determine the optimal operation temperature of the respective filter and to automatically characterize the filter (by measuring its parameters) at its optimal operation temperature.

As mentioned above the optical characteristics of optical devices generally depend on temperature. Thus draught, e.g. caused by opening a door of a room in which the measurement takes place, may lead to a noticeable change of temperature and therefore to falsification of the measurement. With help of the invention the measurement results are comparable and reproducible.

According to a preferred embodiment the measuring system comprises a heating and/or cooling device and/or at least one interface for connecting such a heating and/or cooling device to the measuring system. This heating and/or cooling device is provided for an active control of the temperature of the DUT to be measured. The measurement instrument is directly or via the interface connected to the heating and/or cooling device and is adapted for controlling it such that the heating and/or cooling device prior to the measurement adjusts a predetermined temperature at the DUT and during the measurement observes the predetermined temperature at the DUT. With help of such a heating and/or cooling device it is possible to perform the measurement within a predetermined range of admissible temperatures or nearly exactly at a predetermined optimum temperature. Keeping the temperature at a predetermined level improves the performance of the measurement.

BRIEF DESCRIPTION OF THE DRAWINGS

Other objects and many of the attendant advantages of the present invention will be readily appreciated and become better understood by reference to the following detailed description when considered in connection with the accompanying drawings. Features that are substantially or functionally equal or similar will be referred to with the same reference sign(s).

FIG. 1 is a schematic depiction of a measuring system according to the invention; and FIG. 2 is a schematic illustration of a measurement protocol generated by the measuring system.

DETAILED DESCRIPTION OF PREFERRED EMBODIMENTS ACCRODING TO THE INVENTION

Referring to FIG. 1, a measuring system 1 according to the invention comprises a component holder 2 adapted for providing a support of an optical device 3 to be measured. In the following said device 3 is referred to as "device under test" or "DUT"; consequently the component holder 2 is also referred to as DUT holder 2. Basically the DUT holder 2 can have any convenient form allowing a secure support of the DUT 3. In the depicted embodiment the DUT holder 2 is formed as a plate or table such that the DUT 3 can be applied onto the DUT holder 2. Preferably the DUT holder 2 is attached to a housing 4 of the measurement system 1 in such a way, that vibrations are damped. Therefore, the DUT holder 2 and the supported DUT 3 are isolated from vibrations appearing in the environment of the housing 4 and may be transferred to the housing 4.

The measuring system 1 also comprises at least one measuring instrument 5 with convenient hardware and software not shown. The measuring instrument 5 is adapted to perform measurement of optical parameters $P_1, P_2 \ldots P_n$ (in the following abbreviated with P) of the DUT 3. To this aim the measurement instrument 5 has at least one optical output 6 and at least one optical input 7. In order to optically connect the DUT 3 to the measuring instrument 5 the output 6 of the measuring instrument 5 is connected to an optical input 8 of the DUT 3, and the input 7 of the measuring instrument 5 is connected to an optical output 9 of the DUT 3.

Such optical parameters P can be e.g. spectral loss, polarization depending loss, group delay, differential group delay in transmission and/or reflection. An optical DUT 3 may be e.g. a simple optical fiber or an optical circuit or a highly integrated optical module.

According to the invention the measuring system 1 comprises at least one temperature sensor 10 provided for measuring a temperature T of the DUT 3. Alternatively or additionally the measuring system 1 comprises at least one interface 11 for connecting such a temperature sensor 10. In FIG. 1 are exemplarily shown four of such temperature sensors 10, designated with 10', 10", 10'" and 10"", respectively. The temperature sensors 10 are connected to the measuring instrument 5 via conductors 13 or 13', 13", 13'", 13"", respectively. These four or more or less temperature sensors 10 may be arranged alternatively or cumulatively.

One of the temperature sensors 10 designated with 10' is arranged at a carrier 12 supported by the housing 4. This temperature sensor 10' is adapted for a non-contact and therefore remote measurement of the temperature T of the DUT 3. Another temperature sensor 10 designated with 10" is attached to the DUT 3 provided for a direct measurement of the temperature T of the DUT 3. A further temperature sensor 10 designated with 10'" is integrated into the DUT 3 adapted for measurement of an internal temperature T of the DUT 3. At last, another temperature sensor 10 designated with 10'''' is integrated into the DUT holder 2 and may stay in contact with the DUT 3 providing a direct measurement of the DUT's temperature T. Other convenient arrangements of temperature sensors 10 are not excluded.

The depicted and preferred embodiment of the measuring system 1 also comprises a heating and/or cooling device 14. Alternatively or additionally the measuring system 1 or the measuring instrument 5, respectively, comprises an interface 15 for connecting such a heating and/or cooling device 14 to the measuring system 1 or to the measuring instrument 5, respectively. The heating and/or cooling device 14 may have any suitable design and form. FIG. 1 exemplarily depicts two alternative embodiments of such heating and/or cooling device 14, designated with 14' or 14", respectively. The one heating and/or cooling devices 14' has the form of a plate and is supported by the carrier 12. The other heating and/or cooling device 14" is integrated into the DUT holder 2. Such a heating and/or cooling device 14 is provided to increase or decrease the temperature T of the DUT 3. The measuring instrument 5 is directly or via the interface 15 connected to the respective heating and/or cooling device 14 by means of a controlling conductor 16 (or 16 or 16", respectively), and is adapted for an active control of the temperature T of the DUT 3. Therefore, prior to a measurement of parameters P the measuring instrument 5 triggers the respective heating and/or cooling device 14 for adjusting a predetermined temperature T at the DUT 3. During the measurement the measuring instrument 5 triggers the respective heating and/or cooling device 14 for observing the predetermined temperature T or for adjusting a predetermined development of the temperature T.

The measuring system 1 as shown in FIG. 1 is also provided with a removable hood 17, which may be pivotable attached to the carrier 12, and which covers in this example the DUT holder 2, the DUT 3, the measuring instrument 5, the temperature sensor(s) 10, the carrier 12 and the heating and/or cooling device 14. This hood 17 protects the covered elements against environmental influences and thus improves the performance of the measurement. In a preferred embodiment the hood 17 is made of a thermal insulating material and/or has a thermal insulating design. This configuration provides a thermal isolation of the DUT 3 from the environmental conditions, and therefore leads to further improvement of the measurement.

The temperature sensor 10 or each of the temperature sensors 10, respectively, is adapted for providing a temperature signal correlating with the temperature T of the DUT 3, and sending it via the respective connector 13 to the measuring instrument 5. According to the invention the measuring instrument 5 is adapted to perform a simultaneous and real-time measurement of the temperature T and the optical parameters P of the DUT 3. Preferably the measuring instrument 5 performs a temporally synchronized measurement simplifying an unambiguous or definite association between the optical parameters P and the temperature T of the DUT 3. In order to achieve a definite conjunction between temperature T and parameters P the measuring instrument 5 may be adapted for associating a measured temperature T to each measured parameter P or to each group of measured parameters $P_1, P_2 \ldots P_n$.

Now referring to FIG. 2 the measuring instrument 5 is preferably adapted to generate a measuring protocol 18, in particular in form of a matrix. In the protocol 18 or in the matrix, respectively, N is the number of each measuring interval or measuring step, in which the parameters P and the temperature T are determined. In this example the measuring number N counts from 1 to X intervals or steps. The protocol 18 lists also C, which is a timer signal or measuring time assigned to the measuring number N and hence assigned to the parameters P and the temperature T. The measuring number N and the timer signal C may be provided alternatively or additionally. The single parameters $P_1, P_2 \ldots P_n$ of each measuring number N are measured simultaneously, thus belong essentially to the same measuring time C and create a group of parameters P belonging together.

As can be seen in the matrix or protocol 18 of FIG. 2 the measuring instrument 5 determines a value of the temperature T for each measuring number N and/or at each measuring time C. This measurement routine or process leads to an unambiguous association of a definite temperature T to each single parameter P or to each group or parameters $P_1, P_2 \ldots P_n$.

This protocol 18 allows a temperature depending evaluation of any single parameter P or of any group of parameters $P_1, P_2 \ldots P_n$. With help of the protocol 18 it is also possible to evaluate the dependency of any single parameter P and/or of any group of parameters $P_1, P_2 \ldots P_n$ on the development of the temperature T. Therefore, on the one hand the performance of the parameter measurement can be improved with respect of its reliability and reproducibility. On the other hand an improved measurement leads to an improved control of quality of the optical DUTs 3.

What is claimed is:

1. A measuring system adapted for providing a measurement of an optical parameter of an optical device under test —DUT—, comprising:
    a measuring instrument adapted to perform the measurement and to provide a measurement signal comprising a plurality of values of the measured optical parameter of the DUT over the time,
    wherein the measuring system is adapted to receive a temperature signal comprising a plurality of values of the measured temperature of the DUT over the time, and to provide an output signal wherein values of the measured temperature are associated to such values of the measured optical parameter of the DUT that correspond in time.

2. The measuring system according to claim 1, further comprising at least one of: a temperature sensor, and at least one interface adapted for coupling such a temperature sensor to the measuring system, wherein the temperature sensor is provided for measuring the temperature of the DUT.

3. The measuring system according to claim 2, wherein the temperature sensor is coupled directly or via the interface to the measuring instrument and is adapted for providing the measuring instrument with a temperature signal correlating with the temperature of the DUT.

4. The measuring system according to claim 1, wherein the measuring instrument is adapted for providing at least one of the following features:
    providing a simultaneous real-time measurement of the optical parameter and the temperature of the DUT;
    providing a temporally synchronized real-time measurement of the optical parameter and the temperature of the DUT;
    providing a definite association between the measured temperatures and the measured parameters;
    associating each measured parameter or each group of simultaneously measured parameters to a definite measured temperature;
    generating a measurement protocol listing values for the DUT's temperature associated to the measured parameters and at least one of the group comprising: the measured parameters, a measuring time associated to the measured parameters, and a measuring number associated to the measured parameters.

5. The measuring system according to claim 1, wherein the measuring system comprises a heating and/or cooling device and/or at least one interface for connecting such a heating and/or cooling device to the measuring system, the heating and/or cooling device is provided for an active control of the temperature of the DUT, the measurement instrument is coupled directly or via the interface to the heating and/or cooling device and is adapted for controlling the heating and/or cooling device such that the heating and/or cooling device prior to the measurement adjusts a predetermined temperature at the DUT and during the measurement observes the predetermined temperature at the DUT.

6. The measuring system according to claim 1, wherein the measuring system comprises a DUT holder providing a support for the DUT, the measuring system comprises a hood provided for covering the DUT holder including the supported DUT, the hood has a thermal insulating design and/or is made of a thermal insulating material.

7. The measuring system according to claim 2, comprising at least one of the following features:

the temperature sensor is attached to or integrated in the DUT;

the temperature sensor is arranged at or integrated in the DUT holder;

the temperature sensor is adapted for a remote and non-contact temperature measurement.

8. A method for providing a measurement of an optical parameter of an optical device under test —DUT—, comprising the steps of:

providing a measurement signal, said measurement signal comprising a plurality of values of the measured optical parameter of the DUT over the time, providing a temperature signal, said temperature signal comprising a plurality of values of the measured temperature of the DUT over the time, deriving an output signal, wherein values of the measured temperature are associated to such values of the measured optical parameter of the DUT that correspond in time.

9. The method according to claim 8, wherein the step of measuring of the optical parameter and the temperature of the DUT is performed as at least one of: a simultaneous real-time measurement, and a temporally synchronized real-time measurement.

10. The method according to claim 8, wherein the output signal provides a definite association between the measured temperatures and the measured parameters.

11. The method according to claim 8, wherein each measured parameter or each group of simultaneously measured parameters is associated to a definite measured temperature.

12. The method according to claim 8, further comprising a step of generating a measurement protocol, said measurement protocol listing values for the DUT's temperature associated to the measured parameters and at least one of the group comprising: the measured parameters, a measuring time associated to the measured parameters, and a measuring number associated to the measured parameters.

* * * * *